Nov. 19, 1946.　　　　S. B. WINN　　　　2,411,404
SAFETY JAW FOR FIFTH WHEEL ASSEMBLIES
Filed April 19, 1944　　　4 Sheets-Sheet 1
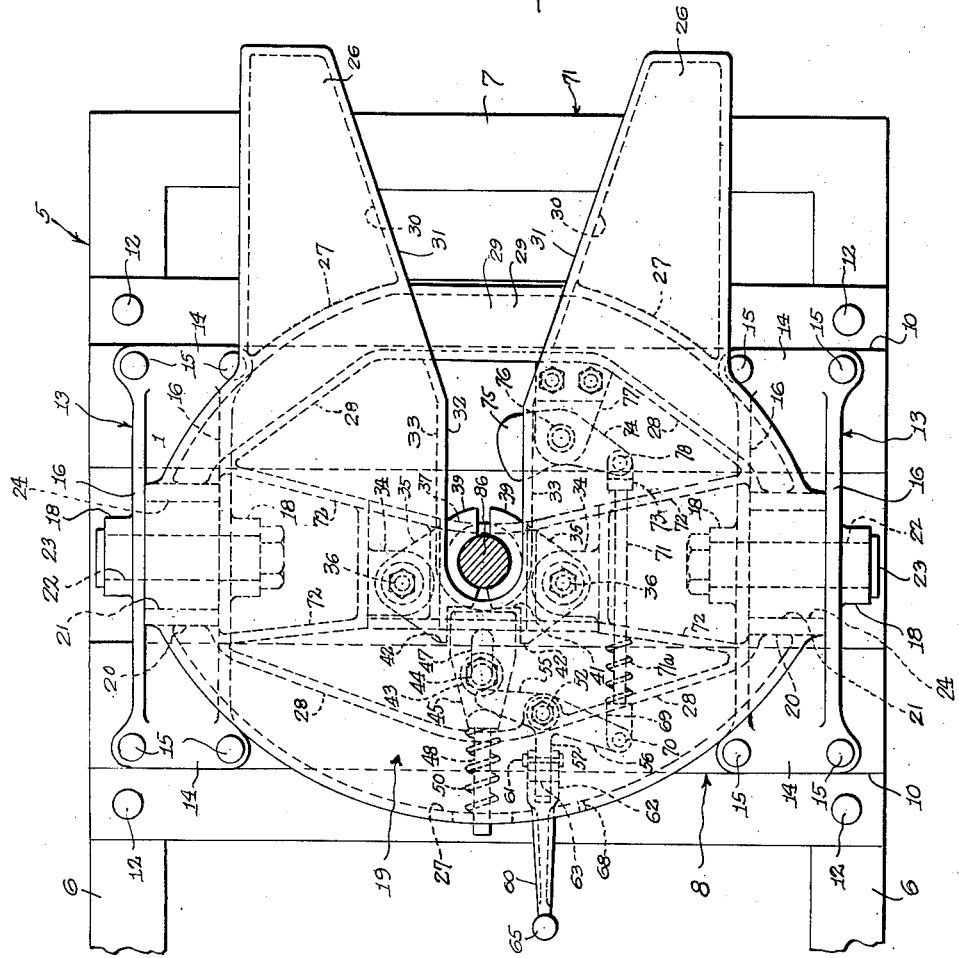
Inventor
Sidney B. Winn
by Barthel & Bugbee
Atty's Nov. 19, 1946.   S. B. WINN   2,411,404
SAFETY JAW FOR FIFTH WHEEL ASSEMBLIES
Filed April 19, 1944   4 Sheets-Sheet 2
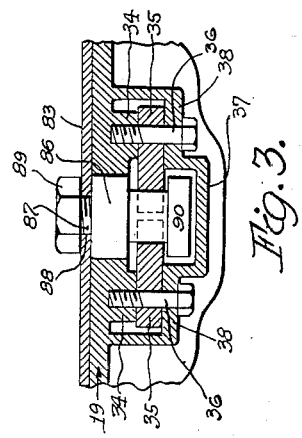
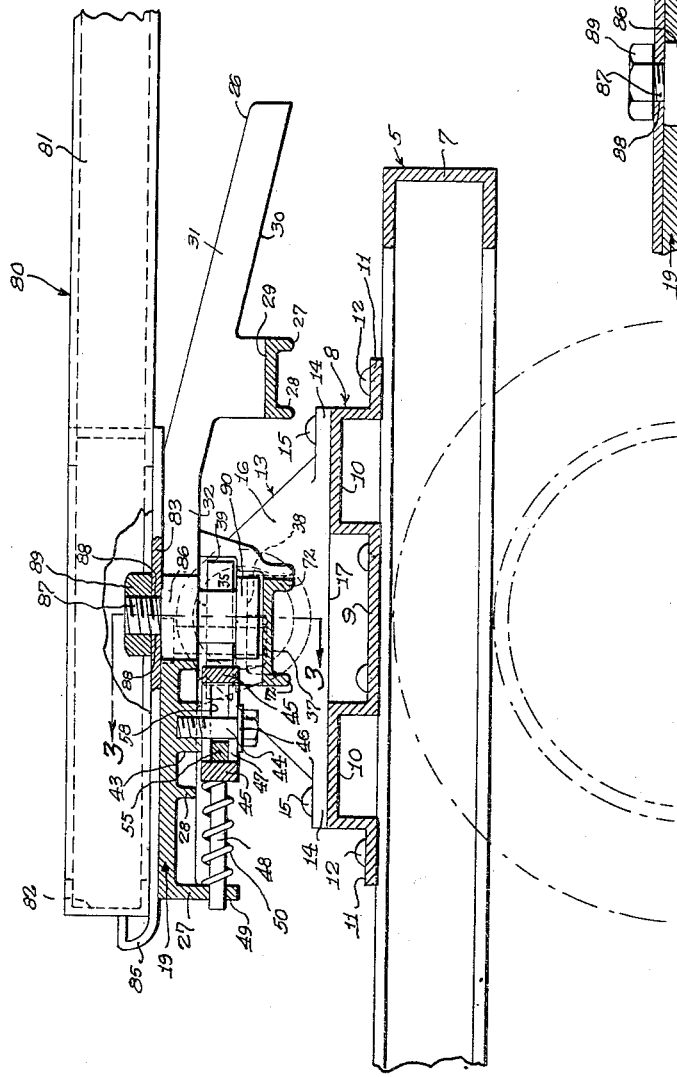
Inventor
Sidney B. Winn
by Barthel & Bugbee
Atty's

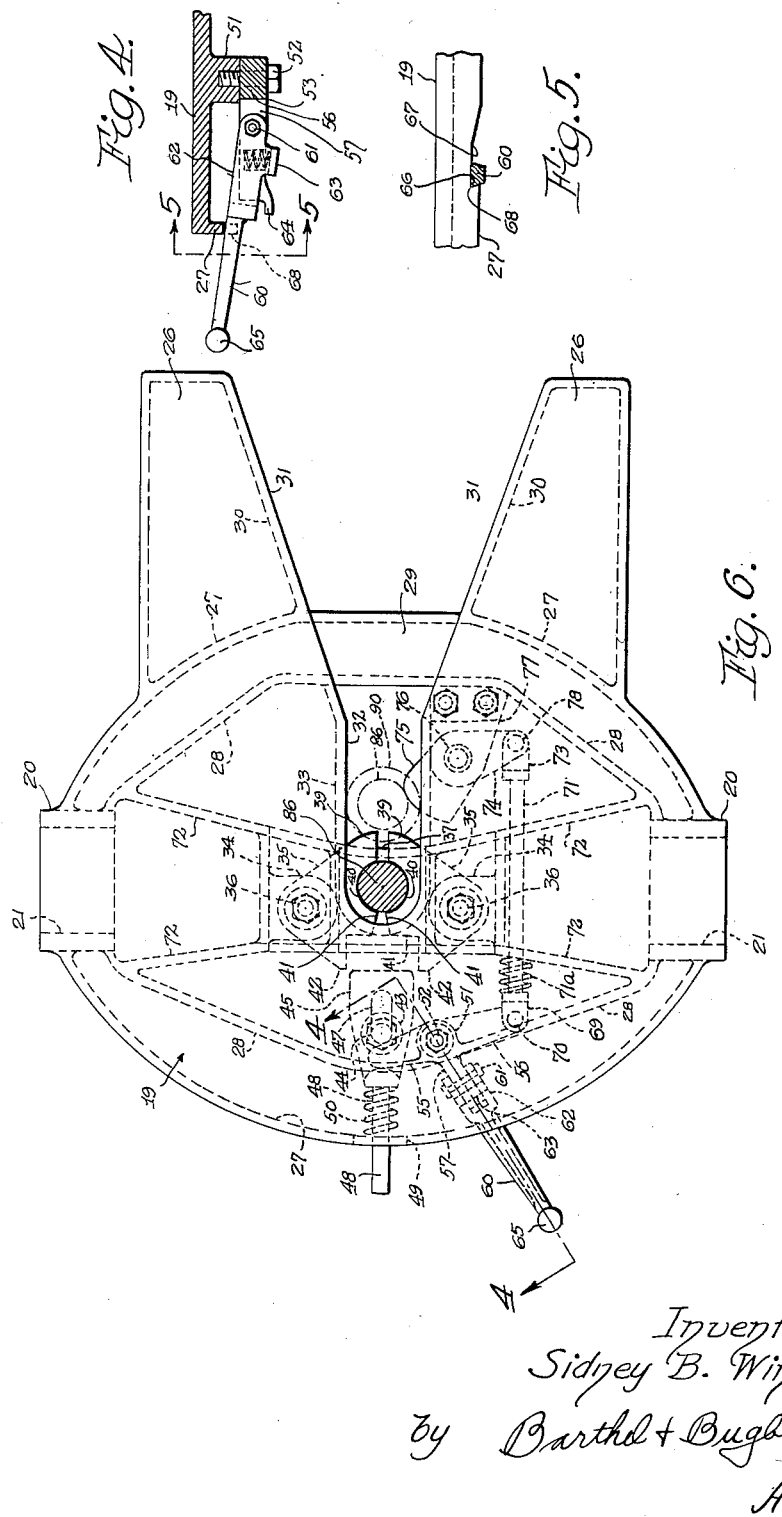

Nov. 19, 1946.  S. B. WINN  2,411,404
SAFETY JAW FOR FIFTH WHEEL ASSEMBLIES
Filed April 19, 1944  4 Sheets-Sheet 4

Inventor
Sidney B. Winn
by Barthel + Bugbee
Atty's

Patented Nov. 19, 1946

2,411,404

UNITED STATES PATENT OFFICE 2,411,404

SAFETY JAW FOR FIFTH WHEEL ASSEMBLIES

Sidney B. Winn, Lapeer, Mich.

Application April 19, 1944, Serial No. 531,701

17 Claims. (Cl. 280—33.1)

This invention relates to vehicles and more particularly, to tractor-trailer vehicles.

The primary object of the invention is to provide a new and improved safety coupling device for tractor and trailer vehicles having means controlled by said coupling means to prevent the separation of said tractor and trailer upon failure of the coupling means.

Another object of the invention is to provide a coupling for tractor and trailer vehicles in which the coupling is set upon intentional separation of tractor and trailer so as to facilitate automatic coupling when the tractor and trailer are moved into draft engagement.

Another object of the invention is to provide a coupling for tractor and trailer combinations as above set forth in which the coupling elements are locked in draft engagement after being coupled in such a manner as to prevent separation thereof.

Another object of the invention is to provide a tractor-trailer combination coupling as above set forth in which an auxiliary locking member is disposed in the path of the king pin coupling member when the tractor and trailer are in draft relationship so as to prevent accidental separation of the tractor and trailer upon failure of the coupling jaws for any reason whatsoever such as by breakage or shearing of the pivot pins of the coupling jaws which retain the same in position.

Other objects and advantages will become apparent during the course of the following description of the accompanying drawings, wherein:

Figure 1 is a top plan view of a tractor coupling member illustrating in detail the arrangement of the jaw members and the auxiliary locking device;

Figure 2 is a longitudinal cross sectional view of the tractor coupling element shown in Figure 1 and illustrating the manner in which a trailer coupling element is adapted for connection therewith;

Figure 3 is a vertical cross sectional view taken on line 3—3 in Figure 2 looking in the direction of the arrows and illustrating the position of the component coupling elements when arranged in draft engagement;

Figure 4 is a cross-sectional view taken on the diagonal line 4—4 in Figure 6 illustrating the latch control member for the coupling jaw members to facilitate intentional separation of the tractor-trailer combination;

Figure 5 is a cross-sectional view taken on line 5—5 in Figure 4 looking in the direction of the arrows and illustrating the keeper notch for retaining the operating lever in a set position;

Figure 7:
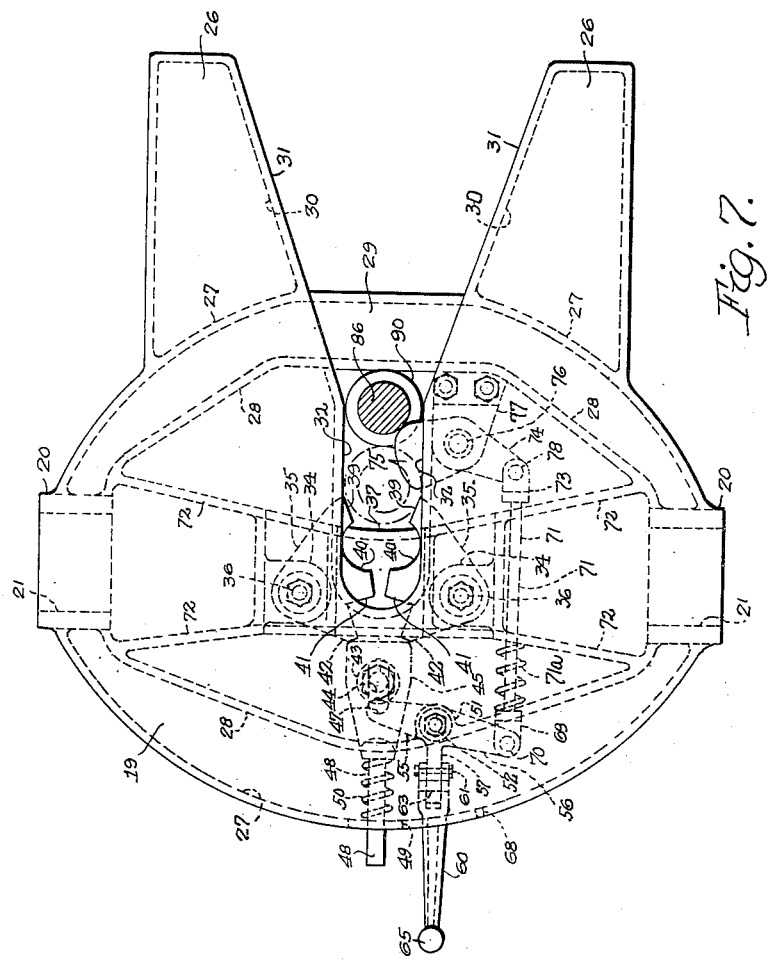

Figure 6 is a top plan view similar to Figure 1, showing the coupling jaw retaining bolt in its retracted position for separation of the tractor-trailer combination; and Figure 7 is a top plan view similar to Figures 1 and 8 showing the jaws separated for receiving the king pin and further illustrating the manner in which the coupling jaw bolt is retracted from engagement with the jaws upon contact of the king pin with a tripping member arranged in the path of movement of the king pin.

In the drawings, wherein for the purpose of illustrating the invention, like reference characters will be employed to designate like parts throughout, the reference character 5 (Figures 1 and 2) will generally be employed to designate a motor vehicle chassis frame including side bars 6 connected by an end bar 7 at the rear end thereof. Extending between the side frame bars 6 at the rear thereof is a frame member 8 having a central indentation 9 thereby providing channel ribs 10 on opposite sides thereof. The frame member 8 is flanged as at 11 to facilitate the frame member 9 being bolted or riveted to the side rails of the chassis frame 5 as at 12.

Secured to the ribbed portions 10 of the frame member 8 and adjacent each end thereof is a trunnion support 13 having flanged portions 14 for receiving anchoring bolts or the like as at 15. The trunnion support 13 includes spaced triangular shaped web portions 16 connecting the base portion 17 and each of said triangular webs 16 is provided with a bearing boss 18 (Figure 1).

Trunnioned between the triangular web portions 16 of the trunnion supports 13 is a turntable 19 having depending bearing bosses 20 provided with aligned openings 21. The depending bearing bosses 20 and aligned openings 21 are adapted to register with openings 22 in the bearing bosses 18 so that pivot bolts 23 may be extended through said aligned openings and support the turntable 19. Interposed between the pivot pin 23 and the openings 21 in the depending bosses 20 is a bearing block 24 which may be replaced when worn to compensate for wear. The turntable 19 is provided with a pair of tail portions 26 defining inclined ramps to facilitate the guiding of the tractor-trailer on the turntable during coupling of the tractor-trailer combination. Formed on the marginal edge of the turntable 19 is a depending flange 27 and the underside of the turntable is braced throughout by means of integrated web portions 28. The marginal flange 27 and integrated web portion 28 extend between the ramp tails 26 and are connected by an integral portion 29 to add rigidity to the structure. Similarly, the marginal edges of the ramp tail 26 are provided with marginal depending flanges 30 and the inner walls of said depending flanges 30 converge as at 31 and terminate in a king pin receiving slot 32 extending to the center of the turntable 19. The slot 32 is provided with a marginal depending flange 33 to add rigidity to the structure and generally reenforce the turntable.

Formed on the underside of the turntable 19 and disposed on opposite sides of the kingpin receiving slot 32 is a pair of depending bosses 34 (Figure 3) to which is pivoted a pair of coupling jaws 35 by means of screws or the like as at 36. A stirrup 37 is integrated with the underside of the turntable 19 and extends beneath the jaws 35 with angular portions thereof as at 38 engaging the underside of each jaw so that the pivot bolts 36 may pass through openings therein and provide spaced bearing surfaces for the coupling jaws. The coupling jaws 35 are provided with complementary jaw surfaces 39 cut away as at 40 to conform to the shape of the king pin carried by the trailer. The rear portion of each coupling jaw is notched as at 41 and the rear ends of the coupling jaws are formed to provide ears 42.

A bolt anchoring boss 43 is formed on the underside of the turntable 19 for receiving a bolt 44 upon which is slidably mounted a spring-projected bolt 45 (Figure 2). A washer 46 is interposed between the head of the bolt 44 and the slotted portion 47 of the bolt 45 so as to maintain the bolt in sliding relation with one end thereof presented to the notches 41 in the coupling jaws 35. Formed integral with the sliding bolt 45 is a guide rod 48 which has its free end extending through an opening 49 in the depending flange 27 to guide the spring-projected bolt in a straight line path. A coil spring 50 encircles the projection 48 and has one end abutting the flange 27 while the opposite end abuts the bolt 45 to normally urge the same into engagement with the notch 41 and hold the bolt projected.

Another bolt-anchoring boss 51 is formed on the under side of the turntable 19 (Figure 4) for receiving a pivot bolt 52 to which is pivoted a bell crank lever 53 having a pair of oppositely disposed arms 55 and 56 and an intermediate arm portion 57. The bell crank arm extension 55 is adapted to extend into a slot 58 in the bolt 45 at right angles to the slot 47 which receives the bolt 44. A control lever 60 is pivoted to the intermediate arm extension 57 by means of a pivot bolt 61 (Figure 4) and said control lever 60 is provided with a bifurcated end portion 62 adapted to straddle the intermediate arm extension 57 so as to move upwardly in the direction of the turntable 19. The bifurcated end of the control lever 60 as at 62 is provided with a stop stirrup 63 which interconnects the bifurcated arms and the extreme free end of the intermediate arm extension 57 is reduced and offset as at 64 to engage the underside of the bifurcated end of the control lever 60 to provide a slot for limited movement of the control lever 60 in the opposite direction. The extreme free end of the control lever is provided with a hand grip 65 and said control lever 60 is shaped in cross section as shown in Figure 5 to provide relatively sharp edge portions 66. One of the edge portions 66 is adapted to engage within a notch 67 in an acute corner thereof as at 68.

The other bell crank arm extension 56 is pivoted to a clevis 69 as at 70 affixed to one end of the reciprocating control link 71 slidably arranged in suitable aligned openings formed in the depending reenforcing ribs 72. The opposite end of the reciprocating control link is likewise affixed to the clevis 73 pivoted to the tail portion 74 of an auxiliary locking jaw member 75. The auxiliary locking jaw member 75 is pivoted to the under side of the turntable 19 by means of a pivot pin 76 passing therethrough and extending into a depending boss 77 likewise on the under side of the turntable 19. A suitable pivot pin 78 extends through the clevis 73 and tail piece 74 so that reciprocation of the rod 71 will project the enlarged portion of the auxiliary member 75 into and out of the king pin slot 32. A coil spring 71a encircles the shaft 71 and has one end in abutting relationship with the clevis 69 and its other end in engagement with the rib 72. The coil spring insures the projection of the jaw 75 into the slot 32 and returns the lever 60 to its normal position.

The trailer construction embodies a chassis frame generally designated by the reference character 80 and said frame includes side rails 81 of channel cross section connected at the front by a transverse frame bar 82. A turntable engaging plate 83 having a relatively smooth surface is welded or otherwise secured to the front end of the chassis frame 80 and the marginal edge of the turntable engaging plate 83 is upturned as at 85 to present a rounded surface engageable with the tailpieces 26 during the coupling operation. A kingpin 86 has its threaded end 87 extending through a suitable opening 88 in the turntable engaging plate 83 and a nut or the like as at 89 is threaded on the threaded portion of the kingpin 87 to anchor said kingpin in position. The lowermost end of the kingpin is provided with an enlarged head as at 90 to prevent vertical movement of the kingpin by means of vibration when the tractor and trailer are in draft engagement and the coupling jaws 39 are in their operative position.

In the operation of the tractor-trailer combination above described, it will first be assumed that the tractor and trailer are in draft relationship, with the coupling jaws 39 in draft relationship with the kingpin 86. In this position, the spring projected bolt 45 is received within the notches 41 in the pivoted coupling jaws 39 so that the curved portions 40 of the jaws will engage the round surface of the kingpin 86 and retain the same in position. When the kingpin coupling jaws 39 are in engagement, the auxiliary jaw member 75 is projected into the slot 32 and into the path of the kingpin 86. Should the jaws 39 fail for any reason whatsoever, the kingpin 86 would be locked in draft engagement with the tractor by means of the auxiliary locking jaw 75.

When it is desired to uncouple the tractor and trailer combination, the control handle 65 is grasped and the control lever 60 swung on its pivot 52 so that the bell crank arm extension 55 will retract the bolt 45 against the action of the coil spring 50. When the bolt 45 is thus retracted from engagement with the notches 41 of the coupling jaws 35, the auxiliary jaw member 75 is retracted simultaneously partially from the kingpin slot 32 with the outer edge thereof in such a position as to be engaged by the kingpin 86 when the tractor and trailer are uncoupled so that said engagement will rock the auxiliary locking jaw member 75 on its pivot 76. Once the bolt 45 is retracted, separation of the tractor and trailer may be easily facilitated and as the tractor and trailer are separated, the jaw portions 39 of the coupling jaws 35 will swing to the position shown in Figure 7 so that as the kingpin engages the auxiliary jaw member 75, the arm 56 will be given a slight movement to disengage the manual control lever 60 from engagement with the corner 68 of the notch 67 in the depending flange 27 of the turntable 19. In other words, as the kingpin 86 is withdrawn from the kingpin slot 32 with the jaw portions 39 separated, the operating lever 60 will be disengaged from its notch 58 to allow the spring 50 to project the bolt 45 into engagement with the sears 42 as shown in Figure 7. Actually, the kingpin 86 simply trips the auxiliary locking jaw 75 as it passes rearwardly through the kingpin slot 32 as indicated in dotted lines in Figure 7 so that the slight tripping movement will cause the manual operating lever to be moved a slight distance, sufficient to disengage the same from the notch 68.

When it is desired to again couple the tractor and trailer combination, the tractor is backed into the trailer so that the ramp tails 26 pass beneath the turntable engaging plate 83. During the backing operation, the kingpin 86 will be guided into the kingpin slot 32 as shown in Figure 7 so that said kingpin will engage the auxiliary locking jaw member 75 and depress the same during its passage thereby. Since the control lever is spring tensioned and gravity biased, the notch 68 will not be engaged thereby when the locking jaw is depressed. After the kingpin 86 has thus engaged and depressed the auxiliary jaw member 75, it will be in position between the complementary coupling jaw members 39 and continued movement of the tractor relative to the trailer will cause said kingpin to engage the tail portions of said complementary coupling jaw members adjacent the notch 41 and thereby swing the jaws 35 on their pivots about said kingpin 86. When the jaws and kingpin have been engaged, the bolt 45 will be spring projected between the notched portions 41 of the complementary coupling jaw members 35. In the last-mentioned position, the tractor and trailer are again in draft relationship with the coupling jaws engaging the kingpin and the auxiliary jaw member 75 projecting into the kingpin slot 32 and into the path of the kingpin as indicated in dotted lines in Figure 6. Should the coupling jaws 35 fail for any reason whatsoever, the same will engage the auxiliary jaw member 75 and retain the tractor and trailer assembly in draft relationship.

It is to be understood that the form of the invention herewith shown and described is to be taken as a preferred embodiment of the same and that various changes may be made in the shape, size and arrangement of parts without departing from the spirit of the invention or the scope of the subjoined claims.

What I claim is:

1. In a tractor-trailer vehicle combination, a coupling pin carried by one of said vehicles, a fifth wheel carried by the other of said vehicles having a slot to receive said coupling pin, a coupling jaw member on the fifth wheel for engaging said coupling pin, means engageable with said coupling jaw member for locking said member in draft relationship with said coupling pin, manually operable latch means for disengaging said locking means and to hold the same in a retracted position, and means extending into said slot engageable by said king pin when said king pin is passing out of said slot for tripping said disengaging means to again project said locking means into engagement with the coupling member after separation of said coupling member and pin and thereby position said coupling member for reception of said coupling pin to effect re-coupling of said tractor-trailer vehicle combination, said tripping means being responsive to the entry of said king pin for temporarily disengaging said locking means from said coupling jaw member and responsive to the locking engagement of said king pin by said coupling jaw member for being temporarily locked in an extended auxiliary locking position in said slot.

2. In a tractor-trailer vehicle combination, a coupling pin carried by one of said vehicles, a fifth wheel carried by the other of said vehicles having a slot to receive said coupling pin, a pair of cooperable coupling members on the fifth wheel for engaging said coupling pin, means engageable with said cooperable coupling members for locking said members in draft relationship with said coupling pin, manually operable means for disengaging said locking means to hold the same in a retracted position, and means extending into said slot for tripping said disengaging means to again project said locking means into engagement with the cooperable coupling members after separation of said cooperating coupling members and pin and thereby position said cooperating coupling members for reception of said coupling pin to effect re-coupling of said tractor-trailer vehicle combination, said means extending into the coupling pin slot and providing an auxiliary locking member in the path of the coupling pin when the tractor and trailer are in coupled relation to prevent accidental separation of the tractor and trailer upon failure of the cooperating coupling members and coupling pin.

3. In a tractor-trailer vehicle combination, a coupling pin carried by one of said vehicles, a fifth wheel carried by the other of said vehicles having a slot to receive said coupling pin, a pair of cooperable coupling members on the fifth wheel for engaging said coupling pin, locking means engageable with said cooperable coupling members for locking said members in draft relationship with said coupling pin, means for disengaging said locking means to hold the same in a retracted position, and means extending into said slot engageable by said king pin during its exit movement therethrough for tripping said disengaging means to again project said locking means into engagement with the cooperable coupling members to hold the same separated after separation of said cooperating coupling members and pin and thereby position said cooperating coupling members for reception of said coupling pin to effect re-coupling of said tractor-trailer vehicle combination, said disengaging means consisting of a manually operable control member adapted to be moved to a predetermined latched position, said tripping means being responsive to the entry of said king pin for temporarily disengaging said locking means from said coupling members and responsive to the locking engagement of said king pin by said coupling members for being temporarily locked in an extended auxiliary locking position in said slot.

4. In a tractor-trailer vehicle combination, a coupling pin carried by one of said vehicles, a fifth wheel carried by the other of said vehicles having a slot to receive said coupling pin, a pair of cooperable coupling members on the fifth wheel for engaging said coupling pin, means engageable with said cooperable coupling members for locking said members in draft relationship with said coupling pin, means for disengaging said locking means to hold the same in a retracted position, and means extending into said slot for tripping said disengaging means to again project said locking means into engagement with the cooperable coupling members after separation of said cooperating coupling members and pin and thereby position said cooperating coupling members for reception of said coupling pin to effect recoupling of said tractor-trailer vehicle combination, said means extending into said slot consisting of a pivoted jaw member spaced from the cooperating coupling members, said tripping means being responsive to the entry of said king pin for temporarily disengaging said locking means from said coupling members and responsive to the locking engagement of said king pin by said coupling members for being temporarily locked in an extended auxiliary locking position in said slot.

5. In a tractor-trailer vehicle combination, a king pin carried by one of said vehicles, a fifth wheel carried by the other of said vehicles having a slot to receive said king pin, a pair of pivoted jaw members on the fifth wheel for engaging said kingpin, means engageable with said pivoted jaw members for locking said members in draft relationship with said king pin, means for disengaging said locking means to hold the same in a retracted position, and means extending into said slot engageable by said king pin during its exit from said slot for tripping said disengaging means to again project said locking means into engagement with the pivoted jaw members to thereby hold the same in an open position after separation of said pivoted jaw members and pin, and thereby position said pivoted jaw members for reception of said king pin to effect re-coupling of said tractor-trailer vehicle combination, said tripping means being responsive to the entry of said king pin for temporarily disengaging said locking means from said jaw members and responsive to the locking engagement of said king pin by said jaw members for being temporarily locked in an extended auxiliary locking position in said slot.

6. In a tractor-trailer vehicle combination, a king pin carried by one of said vehicles, a fifth wheel carried by the other of said vehicles having a slot to receive said king pin, a pair of pivoted jaw members on the fifth wheel for engaging said king pin, means engageable with said pivoted jaw members for locking said members in draft relationship with said king pin, means for disengaging said locking means to hold the same in a retracted position, and means extending into said slot engageable by said king pin during its exit therethrough for tripping said disengaging means to again project said locking means into engagement with the pivoted jaw members after separation of said pivoted jaw members and pin and thereby position said pivoted jaw members for reception of said king pin to effect recoupling of said tractor-trailer vehicle combination, said pivoted jaw members being provided with complementary notched portions for the reception of said means engageable with said jaw members and said tripping means being engageable by said king pin upon re-entrance into said slot for temporarily moving the locking means out of engagement with said jaws until the king pin has been moved therebetween.

7. In a tractor-trailer vehicle combination, a king pin carried by one of said vehicles, a fifth wheel carried by the other of said vehicles having a slot to receive said king pin, a pair of pivoted jaw members on the fifth wheel for engaging said king pin, a spring-projected bolt engageable with said pivoted jaw members for locking said members in draft relationship with said king pin, manually controlled latch means for disengaging said spring projected bolt to hold the same in a retracted position, and means extending into said slot engageable with said king pin during its exit movement therethrough for tripping said disengaging means to again project said spring-projected bolt into engagement with the pivoted jaw members after separation of said pivoted jaw members and pin and thereby position said pivoted jaw members for reception of said king pin to effect coupling of said tractor-trailer vehicle combination, said tripping means being engageable by the king pin upon re-entrance thereof into said slot for moving the spring-projected bolt a sufficient distance to permit closing of said jaw members about the king pin and movement of said bolt to a fully locked position.

8. In a tractor-trailer vehicle combination, a king pin carried by one of said vehicles, a fifth wheel carried by the other of said vehicles having a slot to receive said king pin, a pair of pivoted jaw members on the fifth wheel for engaging said king pin, means engageable with said pivoted jaw members for locking said members in draft relationship with said king pin, a manually controlled operating lever for disengaging said locking means, latch means to hold the lever and locking means in a retracted position, and means extending into said slot engageable by the king pin during its movement out of said slot for tripping said latch means and manually controlled operating lever to again project said locking means into engagement with the pivoted jaw members after separation of said pivoted jaw members and pin and thereby position said pivoted jaw members for reception of said king pin to effect recoupling of said tractor-trailer vehicle combination, said tripping means being engageable by the king pin upon re-trance into said slot for temporarily moving said locking means to a position wherein the jaw members are free to move into engagement with the king pin before the locking means is finally projected into locking engagement with said jaw members.

9. In a tractor-trailer vehicle combination, a king pin carried by one of said vehicles, a fifth wheel carried by the other of said vehicles having a slot to receive said king pin, a pair of pivoted jaw members on the fifth wheel for engaging said king pin, means engageable with said pivoted jaw members for locking said members in draft relationship with said king pin, means for disengaging said locking means to hold the same in a retracted position, and an auxiliary lock jaw member extending into said slot for tripping said disengaging means to again project said locking means into engagement with the pivoted jaw members after separation of said pivoted jaw members and pin and thereby position said pivoted jaw members for reception of said king pin to effect coupling of said tractor-trailer vehicle combination.

10. In a tractor-trailer vehicle combination, a king pin carried by one of said vehicles, a fifth wheel carried by the other of said vehicles having a slot to receive said king pin, a pair of pivoted jaw members on the fifth wheel for engaging said king pin, a spring projected bolt for engaging said jaw members to retain said members in a locked position, manually operable means for disengaging said spring projected bolt, latch means to hold the bolt in a retracted position, and means extending into said slot engageable with the king pin on removal thereof from said slot for tripping said disengaging means to again project said spring-projected bolt into engagement with the pivoted jaw members after separation of said pivoted jaw members and pin and thereby position said pivoted jaw members for reception of said king pin to effect recoupling of said tractor-trailer vehicle combination, said spring-projected bolt being adapted to be received in complementary notched portions of said pivoted jaw members to hold said jaw members in draft engagement with said king pin and said tripping means being engageable upon re-entrance into said slot for temporarily moving the bolt out of engagement with said jaw members until the king pin has been moved to a position therebetween whereby said bolt may be projected into said notched portion of said member and reestablish said vehicle combination in draft relationship.

11. A fifth wheel construction for tractor-trailer vehicles, comprising a turntable mounted on one of said vehicles having a slot for receiving a king pin carried by the other vehicle, a coupling member on said turntable to project into said slot and engage said king pin, a spring-projected locking bolt engageable with said coupling member to lock the same in a closed position, a manually controlled actuator on the turntable for retracting said bolt, an auxiliary locking jaw member extending into said king pin slot for preventing accidental removal of the king pin, and a link connecting said auxiliary jaw member to said lever whereby said auxiliary jaw member will be engaged by the pin during its exit and entrance with respect to said slot for controlling the locking bolt.

12. A fifth wheel construction for tractor-trailer vehicles, comprising a turntable mounted on one of said vehicles, having a slot for receiving a king pin carried by the other vehicle, a pair of coupling jaws pivoted to said turntable to project into said slot and engage said king pin, a locking bolt engageable with complementary notched portions of said jaws to lock said jaws in a closed position, a manually controlled lever pivoted to the turntable for retracting said bolt, an auxiliary locking jaw member extending into said king pin slot engageable by the king pin during intentional separation of said tractor-trailer vehicle for controlling said locking bolt and engageable with said king pin during unintentional separation of said tractor-trailer for preventing removal of the king pin, and a link connecting said manually controlled operating lever to said auxiliary locking jaw member to release said lever from its manually set position and project said bolt when the coupling jaws and king pin have been intentionally separated to thereby hold said coupling jaw members separated until recoupling of said jaw members and king pin.

13. A fifth wheel construction for tractor-trailer vehicles, comprising a turntable mounted on one of said vehicles having a slot for receiving a king pin carried by the other vehicle, a pair of coupling jaws pivoted to said turntable to project into said slot and engage said king pin, a locking bolt engageable with complementary notched portions of said jaws to lock said jaws in a closed position when said king pin and coupling jaws are in draft relationship, a manually controlled lever pivoted to the turntable for retracting said bolt, latch means engageable with said lever to hold the same in a predetermined position, an auxiliary locking jaw member extending into said king pin slot for preventing removal of the king pin, a link connecting said manually controlled operating lever and auxiliary locking jaw to release said lever from its manually set position and project said bolt into engagement with said jaws to hold the same in an open position when the coupling jaws and king pin have been intentionally separated, and spring means for urging said locking bolt into said complementary notched portions of said jaws whereby intentional separation of the coupling jaws and king pin may effect a resetting of said bolt to permit the recoupling of said jaws with the king pin and the automatic locking of said jaws in draft engagement, said auxiliary locking jaw being arranged for being engaged by the king pin during its re-entrance into said slot to temporarily move the locking bolt out of engagement with said jaw members to facilitate free movement of the coupling jaws into engagement with the king pin and the positioning of said notched portion for reception of said locking bolt.

14. A fifth wheel construction for tractor-trailer vehicles, comprising a turntable mounted on one of said vehicles having a slot for receiving a king pin carried by the other vehicle, a pair of coupling jaws pivoted to said turntable to project into said slot and engage said king pin, a locking bolt engageable with complementary notched portions of said jaws to lock said jaws in a closed position, a manually controlled lever pivoted to the turntable for retracting said bolt, an auxiliary locking jaw member extending into said king pin slot for preventing accidental removal of the king pin, and a link operatively connecting said manually controlled lever and auxiliary locking jaw, whereby engagement of said auxiliary locking jaw by the king pin during intentional uncoupling thereof will release said bolt for re-engagement with the notched portions of the coupling jaws when the tractor and trailer are again assembled in coupled relation.

15. A fifth wheel construction for tractor-trailer vehicles, comprising a turntable mounted on one of said vehicles having a slot for receiving a king pin carried by the other vehicle, a pair of coupling jaws pivoted to said turntable to project into said slot and engage said king pin, a locking bolt engageable with complementary notched portions of said jaws to lock said jaws in a closed position, a manually controlled lever pivoted to the turntable for retracting said bolt, an auxiliary locking jaw member extending into said king pin slot for preventing accidental removal of the king pin, and a link operatively connecting said manually controlled lever and auxiliary locking jaw, whereby engagement of said auxiliary locking jaw by the king pin during intentional uncoupling thereof will release said bolt for re-engagement with the notched portions of the coupling jaws when the tractor and trailer are again assembled in coupled relation, said link being resiliently urged in one direction to return the operating lever to a locking position wherein the bolt will be projected.

16. A fifth wheel construction for tractor-trailer vehicles, comprising a turntable mounted on one of said vehicles having a slot for receiving a king pin carried by the other vehicle, a pair of coupling jaws pivoted to said turntable to project into said slot and engage said king pin, a locking bolt engageable with complementary notched portions of said jaws to lock said jaws in a closed position, a manually controlled lever pivoted to the turntable for retracting said bolt, an auxiliary locking jaw member extending into said king pin slot for preventing accidental removal of the king pin, and a link operatively connecting said operating lever with said auxiliary jaw, said turntable being provided with a keeper notch for holding the manually controlled lever in a set position whereby engagement of the auxiliary jaw member by the king pin during intentional separation of the coupling jaws and king pin will release the operating lever from said notch and project said bolt into engagement with the coupling jaws.

17. A fifth wheel construction for tractor-trailer vehicles, comprising a turntable mounted on one of said vehicles having a slot for receiving a king pin carried by the other vehicle, a pair of coupling jaws pivoted to said turntable to project into said slot and engage said king pin, a locking bolt engageable with complementary notched portions of said jaws to lock said jaws in a closed position, a manually controlled lever pivoted to the turntable for retracting said bolt, an auxiliary locking jaw member extending into said king pin slot for preventing accidental removal of the king pin, and a link operatively connecting said operating lever with said auxiliary jaw, said turntable being provided with a keeper notch for holding the manually controlled lever in a set position whereby engagement of the auxiliary jaw member by the king pin will release the operating lever from said notch and project said bolt into engagement with the coupling jaws, said coupling jaws being held in their separated position until the king pin is again brought into coupling engagement therewith.

SIDNEY B. WINN.